(12) United States Patent
Reznack et al.

(10) Patent No.: US 9,915,727 B1
(45) Date of Patent: Mar. 13, 2018

(54) AGILE SENSING FOR RADAR AND METAL DETECTION

(71) Applicant: L-3 Communications Security and Detection Systems, Inc., Woburn, MA (US)

(72) Inventors: Victor V. Reznack, Orlando, FL (US); Herbert Duvoisin, III, Orlando, FL (US); Joe R. Jordan, III, St. Cloud, FL (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 321 days.

(21) Appl. No.: 14/821,340

(22) Filed: Aug. 7, 2015

Related U.S. Application Data (60) Provisional application No. 62/037,302, filed on Aug. 14, 2014.

(51) Int. Cl.
*G01S 13/88* (2006.01)
*G01S 13/04* (2006.01)

(52) U.S. Cl.
CPC ............ *G01S 13/04* (2013.01); *G01S 13/885* (2013.01)

(58) Field of Classification Search
CPC ........ G01S 13/885; G01S 13/88; G01S 13/04; G01S 13/34; G01S 13/343

USPC .......................................................... 342/22
See application file for complete search history.

(56) References Cited

U.S. PATENT DOCUMENTS

| | | | | |
|---|---|---|---|---|
| 9,024,808 B2* | 5/2015 | Kleman | ................ | G01F 23/284 342/118 |
| 2006/0267828 A1* | 11/2006 | Steinway | ................ | F41H 11/12 342/22 |

* cited by examiner

*Primary Examiner* — Timothy A Brainard
(74) *Attorney, Agent, or Firm* — Fish & Richardson P.C.

(57) ABSTRACT

Methods, systems, and apparatus for transmitting a first set of stepped-frequency CW signals having first signal parameters, where the first signal parameters includes a first bandwidth and a first step size between signal frequencies. Detecting reflections of the first set of transmitted CW signals. Identifying an indication of a potential target in a frequency range of the reflections of the first set of transmitted CW signals from the detected reflections of the first set of transmitted CW signals. Determining second signal parameters for a second set of stepped-frequency CW signals in response to identifying the indication of the potential target. The second signal parameters include a second bandwidth and a second step size between signal frequencies, and where the second signal parameters focus on the frequency range in which the indication of the potential target is identified. Transmitting the second set of CW signals.

19 Claims, 7 Drawing Sheets

AGILE SENSING FOR RADAR AND METAL DETECTION

CROSS-REFERENCE TO RELATED APPLICATIONS

This application claims the benefit of U.S. Provisional Patent Application No. 62/037,302, filed Aug. 14, 2014, the entirety of which is hereby incorporated by reference as if fully set forth therein.

TECHNICAL FIELD

This disclosure relates to ground penetrating radar and metal detection.

SUMMARY

In general, innovative aspects of the subject matter described in this specification can be embodied in methods that include actions of transmitting a first set of stepped-frequency CW signals having first signal parameters, where the first signal parameters includes a first bandwidth and a first step size between signal frequencies. Detecting reflections of the first set of transmitted CW signals. Identifying an indication of a potential target in a frequency range of the reflections of the first set of transmitted CW signals from the detected reflections of the first set of transmitted CW signals. Determining second signal parameters for a second set of stepped-frequency CW signals in response to identifying the indication of the potential target. The second signal parameters include a second bandwidth and a second step size between signal frequencies, and where the second signal parameters focus on the frequency range in which the indication of the potential target is identified. Transmitting the second set of CW signals. Other implementations of this aspect include corresponding systems and devices configured to perform the actions of the methods. Other implementations can include computer programs encoded on a computer readable storage medium.

These and other implementations can each optionally include one or more of the following features. The first set of stepped-frequency CW signals can be transmitted during a first frame period, and the second set of stepped-frequency CW signals can be transmitted during a second frame period. The second bandwidth can be smaller than the first bandwidth and the second step size can be smaller than the first step size. The second bandwidth can encompass the frequency range of the first set of CW signals in which the potential target is identified.

The second set of stepped-frequency CW signals can include a first subset of stepped-frequency CW radar signals and a second subset of stepped-frequency CW signals. The first subset of stepped-frequency CW signals can have a bandwidth approximately the same as the first bandwidth, and a step size greater than the first step size. The second subset of stepped-frequency CW signals can have a bandwidth less than the first bandwidth that encompasses the frequency range of the first set of CW signals in which the potential target is identified, and a step size less than the first step size. The first set of stepped-frequency CW signals can be transmitted during a first frame period, and the second set of stepped-frequency CW radar signals, including the first and second subsets stepped-frequency CW signals, can be transmitted during a second frame period.

The second signal parameters for the second set of stepped-frequency CW signals can be determined based on estimating a depth of the potential target. The second signal parameters for the second set of stepped-frequency CW signals can be determined based on determining a material, size, or shape of the potential target.

The first set of stepped-frequency CW radar signals can include a first subset of stepped-frequency CW radar signals and a second subset of stepped-frequency CW radar signals. The first subset of stepped-frequency CW radar signals can be configured for detecting a first target type or targets at a first depth, and the second subset of stepped-frequency CW radar signals can be configured for detecting a second target type or targets at a second depth.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The techniques discussed below can be employed to improve the performance of ground penetrating radar (GPR) detectors and metal detectors. The techniques can also be employed to adapt GPR and metal detectors to different environments, target types, or target depths.

Implementations of the present disclosure will be discussed in further detail with reference to continuous wave GPR detectors, however, they can also be applied to pulsed GPRs and metal detectors (e.g., continuous wave metal detectors (CWMD) or pulsed metal detectors). Specifically, the implementations of the present disclosure will be discussed with respect to stepped-frequency continuous wave (SFCW) GPR detectors. GPR detectors and metal detectors are used to detect buried objects. To detect buried objects, the radar system transmits signals that pass through the ground and reflect off of buried objects. The GPR detector detects objects by analyzing the return signals. GPR detectors can further process the return signals to determine various characteristics of an object such as, for example, the depth of the object, object type, and/or material of the object. Often, however, targeted objects (e.g., mines) are obscured by clutter. For example, clutter may include buried trash or rocks. The transmitted signals are reflected by both the target objects and the clutter. Reflections from the clutter can mask return signals from the targets.

GPR detectors may transmit sets of SFCW signals in frame periods that define parameters for the signals and, in some examples, correspond to a refresh rate of a display. For example, during each radar frame period, SFCW GPR detectors transmit a set of electromagnetic signals, each at a different frequency, and sample reflections of the transmitted signals. GPR detectors analyze the reflections to detect buried objects, distinguish target objects from clutter, and determine features of the target objects (e.g., target depth, type, material, etc.). The various frequencies of the electromagnetic signals are separated by a step size (e.g., 55 MHz between each signal, 40 MHz, or some other size), and together the signals cover a bandwidth ranging from, for example, 0.4 GHz to 8.0 GHz or 1 GHz to 4.0 GHz. Generally, SFCW GPR detectors use a relatively large step size between frequencies to obtain adequate range resolution, and cover a wide frequency bandwidth as compared to narrow-band continuous wave (CW) systems. The large step size is used to limit the total number of signals transmitted across the wide frequency band of signals while, due to system limitations, maintaining a desired frame rate. In some examples, the large step size results in omitted spectral details that may be available using a narrow-band system.

Implementations of the present disclosure may maintain the desired frame rate and capture previously omitted spectral details by varying parameters of the set of signals (e.g., number of signals, step size, frequency band, etc.) transmitted during a frame. For example, upon detecting a potential target, implementations can determine appropriate signal parameters to capture additional spectral detail. The additional detail can be used to verify whether the potential target is a target or clutter, or to perform a more detailed analysis of the characteristics of the potential target. For instance, a GPR device may estimate a depth of a potential target, and, based on the estimated depth, determine appropriate signal parameters to analyze targets at the estimated depth. Signals having the determined parameters can then be transmitted during a subsequent frame.

The techniques discussed below may improve range resolution using a large bandwidth while still being capable of capturing previously omitted spectral details. Features may improve overall performance of GPR systems and metal detectors by increasing the probability of detection (Pd) and minimizing the false alarm rate (FAR). Features may provide improved support for target/clutter spectral discrimination algorithms and magnitude based detection algorithms together. Features may provide enhanced integration gain in the spectral domain by modifying transmitted frequencies in real time to focus on bandwidths appropriate for potential targets. The techniques may enable any particular sensor (e.g., GPR or metal detector) capable of operating as if it were any of several different fixed frequency sensors. These features may permit the lowering of FAR thresholds to increase the number of possible target detections, and then permit further interrogation of the potential targets using tailored signal parameters.

As used herein the term "real time" refers to transmitting, receiving, and processing signals without intentional delay given the processing limitations of a system. For example, "real time" operating modes changes for a GPR or metal detecting device refer to shifting from one operating mode to another within a limited number of frame periods, e.g., one, two, five or some other number. For example, during a first frame period signals may be transmitted, received, and processed using a first operating mode and, in response to target information obtained during the first frame period, the device may shift to a second operating mode for the subsequent frame period.

Figures 1A, 1B:
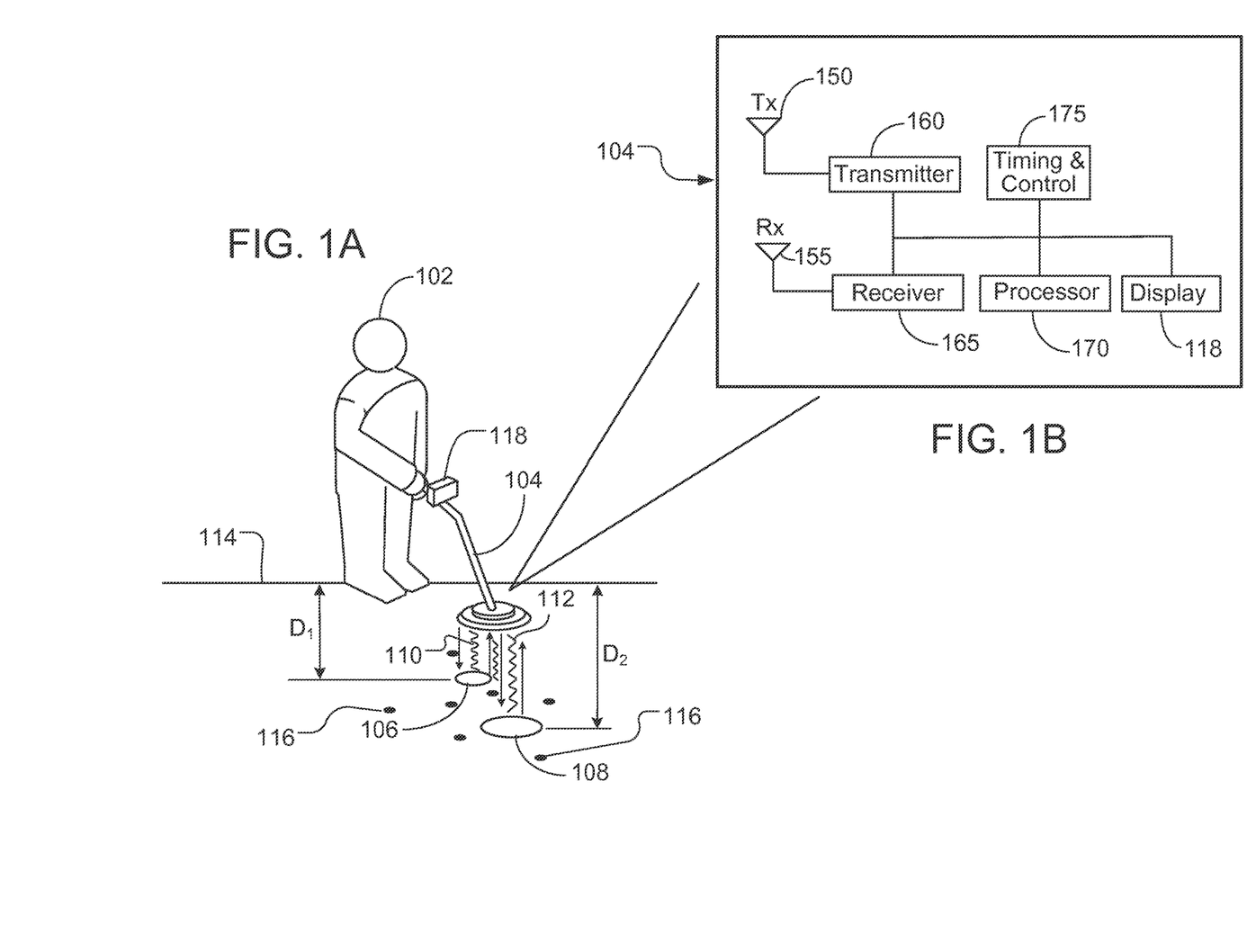
FIG. 1A shows an example of a ground penetrating radar (GPR) device operated by a user.
FIG. 1B shows a block diagram of on an example GPR device.

FIG. 1A shows an example of a GPR device 104 operated by a user 102. The GPR device 104 may be referred to as an SFCW radar. In operation, the device 104 generates multiple electromagnetic signals 110, 112, each at a different frequency. For example, the signals 110, 112 can be pure sinusoidal signals each having a different frequency. The device 104 directs the multiple signals towards the ground 114 to detect objects buried objects 106, 108, 116. The device 104 detects reflections of the transmitted signals 110, 112, analyzes the reflections to detect objects, distinguishes target objects 106, 108 from clutter objects 116, and determines features of the target objects (e.g., target depth, type, material, etc.).

FIG. 1B shows a block diagram of on an example GPR device 104. The GPR device 104 may be used in any of the examples discussed above. The device 104, which may be a handheld stepped-frequency GPR scanner or a CWMD, includes antennas 150 and 155 for transmitting and receiving a stepped-frequency radio frequency signal (an "RF signal"). Although in this example, the device 104 is handheld, in other examples, the device 104 may be vehicle-mounted or mounted on a push-cart.

The device 104 is shown as a bistatic radar system, in that there are separate antennas for transmitting and receiving the RF signal. In particular, the antenna 150 is connected to a radar transmitter and transmits an RF signal toward a target, and the antenna 155 is connected to a radar receiver and receives a portion of the RF signal that is reflected by the target. In another implementation, device 104 may be a monostatic radar system that uses a single antenna to transmit and receive the RF signal. The following discussion assumes that the antenna 150 is the transmitting antenna and the antenna 155 is the receiving antenna.

The transmit antenna 150 is connected to a radar transmitter 160 that transmits RF signals toward a target. The RF signals include a set of frequencies that cover a bandwidth in increments of frequency steps. All of the signals in a set of signals may be transmitted and received once within one radar frame. For example, during one radar frame one hundred forty RF signals may be transmitted and received. The signals may range from 0.4 GHz to 8.0 GHz in steps of 55 MHz. The number of signals transmitted and received may, in some examples, be limited by a desired frame rate for the device 104. For example, in order to adequately receive, process, and display information related to buried objects to a user in a relevant time period the device 104 may be required to refresh the displayed data at a predetermined frame rate (e.g., 100 Hz).

The receive antenna 155 is connected to a radar receiver 165 and receives the reflected RF signals from the target. For simplicity, the receive antenna 155 is discussed in terms of the implementation including a single antenna. Nevertheless, the receive antenna 155 may represent two or more antennas.

Implementations employing multiple antennas may each have a dedicated receiver or may share the receiver 165. The receiver 165 is coupled to a processing system 170 that processes received RF signals from the receiving antenna 155. The processing system 170 can be any type of one or more electronic processors, and the processing system includes an electronic storage (not shown) that stores instructions that, when executed cause the electronic processor to process, manipulate, or analyze data from the receiver 165. In addition, the processing system 165 cooperates with the transmitter 160 to control parameters of the RF signals transmitted during a radar frame. For example, as discussed in more detail below, the processing system 165 can adjust frame parameters on a frame-by-frame basis to account for variables such as, for example, environment (e.g., soil type), target depth, target type, etc. Signal parameters for a radar frame can include, for example, the number of signals (N) transmitted during the frame, a beginning frequency for the frame (e.g., 0.4 GHz), and ending frequency for the frame (e.g., 8.0 GHz), and a frequency step size between transmitted RF signals in the frame (e.g., 55 MHz), as well as arbitrary placement of each individual frequency.

The signal processing system 170 is coupled to a display 118 and a timing and control module 175. The display 118 provides an audible and/or a visual alert when an object is detected by the scanner. The timing and control module 175 may be connected to the transmitter 160, the receiver 165, the signal processor 170, and the display 118. The timing and control module provides signals, such as a clock signal and control signals, to the other components of the device 104.

Referring to FIG. 1A, the GPR device 104 can adjust radar frame parameters to obtain more detailed spectral information from a detected target or to increase the Pd of otherwise undetected targets. For example, the signal reflection characteristics differ for objects based on the depth of the object or the material of the object. The signal transmission parameters of the GPR device 104 can be automatically adjusted to accommodate for such variables. When the GPR device 104 detects an object during one frame, the device 104 can adjust the parameters of a subsequent radar frame based on characteristics of the detected object, for example, to obtain more detailed data about the object and confirm the detected object as a target object or clutter.

For example, signal reflection characteristics differ for objects buried at different depths, such as target objects 106 and 108, due to signal absorption and attenuation by the ground 114. For example, a deep target object 108 may respond better to lower frequency signals 112, while a shallower target object 106 may respond better to higher frequency signals 110. Therefore, in some implementations, upon detecting a target, the GPR device 104 can estimate a depth of the target and adjust radar frame parameters of a subsequent radar frame to correspond to signals best suited for analyzing the detected target, for example, as described below in reference to FIGS. 2A-2C. In response to determining an estimated depth of a target object 106 from signals transmitted and received in a first radar frame, the processing system 170 can determine appropriate parameters for the signals in a second radar frame. More specifically, if the GPR device 104 determines that an estimated depth of a detected object is within a predetermined shallow depth range (e.g., a shallow target), the GPR device 104 can focus the parameters of the signals in the second frame in a frequency band that is suitable for within the depth range.

In addition, signal reflection characteristics may differ based on various properties of the objects themselves including, for example, type, shape, orientation, material, or other properties. For example, a metallic target object 108 may respond better to signals 112 in a first band frequencies, while a non-metallic target object 106 may respond better to signals 110 in a second band of frequencies. Therefore, in some implementations, upon detecting a target, the GPR device 104 may determine a material of a potential target, based on characteristics of the reflected signals (e.g., amplitude, phase, frequency response). The GPR device 104 may then adjust radar frame parameters of a subsequent radar frame to correspond to signals best suited for analyzing the detected target, for example, as described below in reference to FIGS. 2A-2C. For example, in response to determining from signals transmitted and received in a first radar frame that a target object 106 is metallic, the processing system 170 can determine appropriate parameters for the signals in a second radar frame that are suitable for metallic targets.

In yet other examples, the GPR device 104 may detect features of a return signal that are not particularly indicative of a target object, but which nonetheless, are distinct from background reflections. In order to verify whether such features represent, for example, a weak return from a target, the GPR device 104 may select appropriate signal parameters for a subsequent frame to further interrogate the features. For example, if the features occur in a narrow range of a wide band of search frequencies (e.g., a band of 500 MHz in a 7.6 GHz search band), the GPR device 104 can focus the interrogation signals within the narrow range (e.g., 500 MHz), and use a smaller step size (e.g., 3.5 MHz). This may improve signal to noise ratio of the returned signals, and permit the GPR device to positively identify the features as an indication of a target object or not. In some implementations, such a process as described may be accomplished by reducing target detection thresholds (e.g., FAR thresholds), thereby, causing the GPR device 104 to further interrogate potential targets more often.

In some examples, the second radar frame can immediately follow the first radar frame during which the target object 106 was detected. That is, in some examples, the GPR device 104 can change signal parameters of radar frames in real time. In some examples, the second radar frame can be subsequent in time to the first radar frame, but with one or more additional frames occurring between the first and the second frames.

Figure 2A:
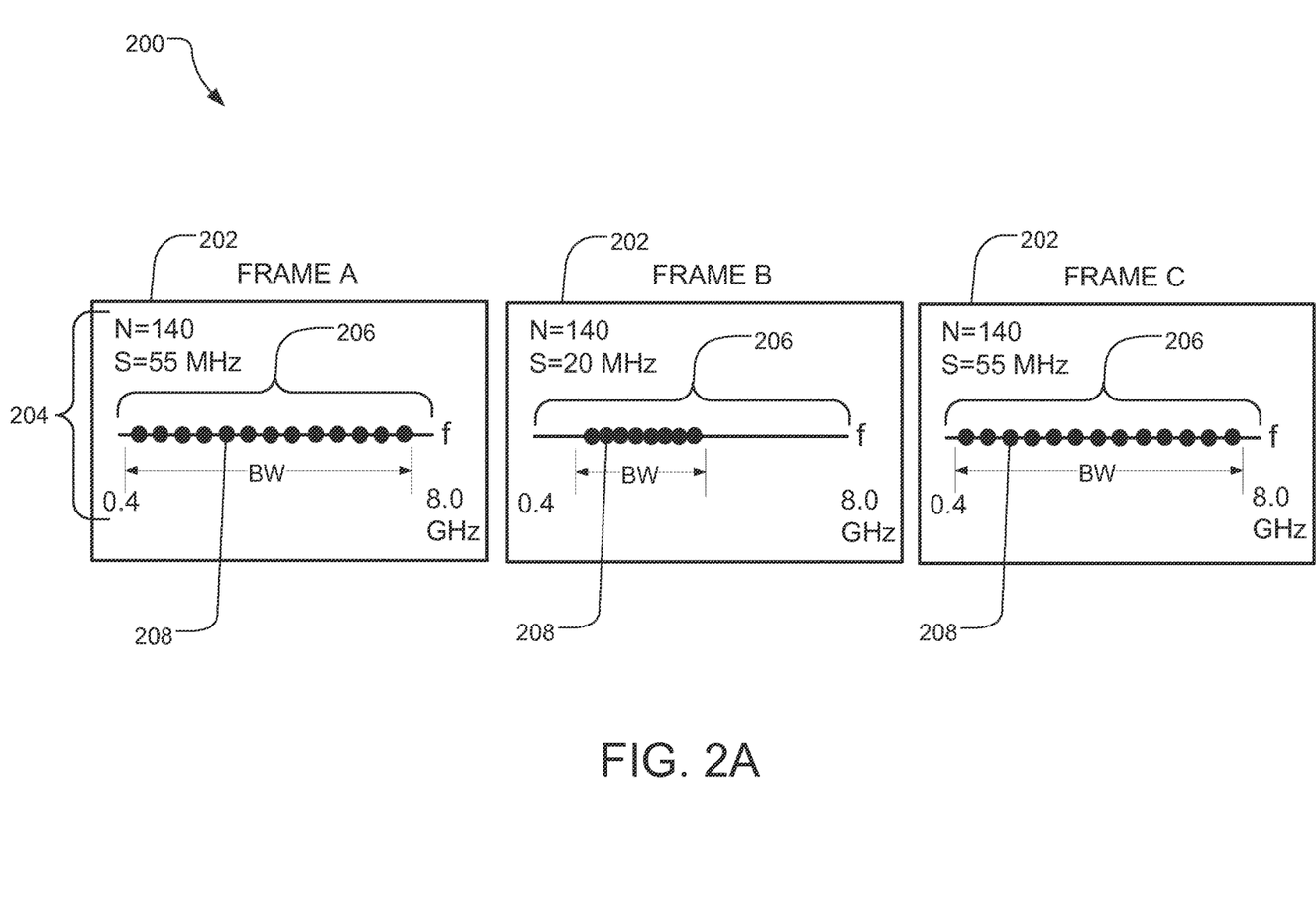
FIGS. 2A-2C depict graphical representations of example sequences of radar frames of a GPR device.
Figure 2B:
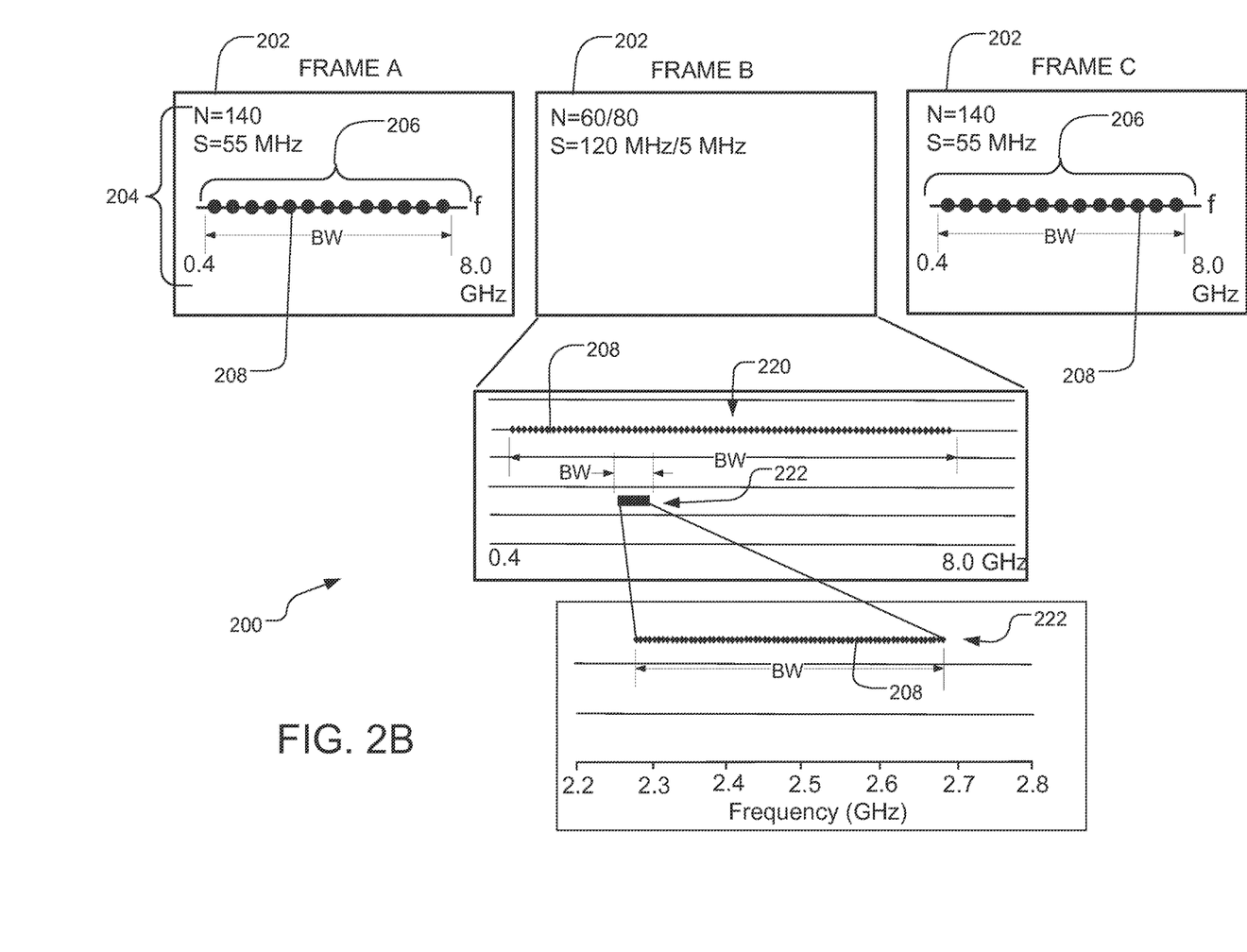
Figure 2C:
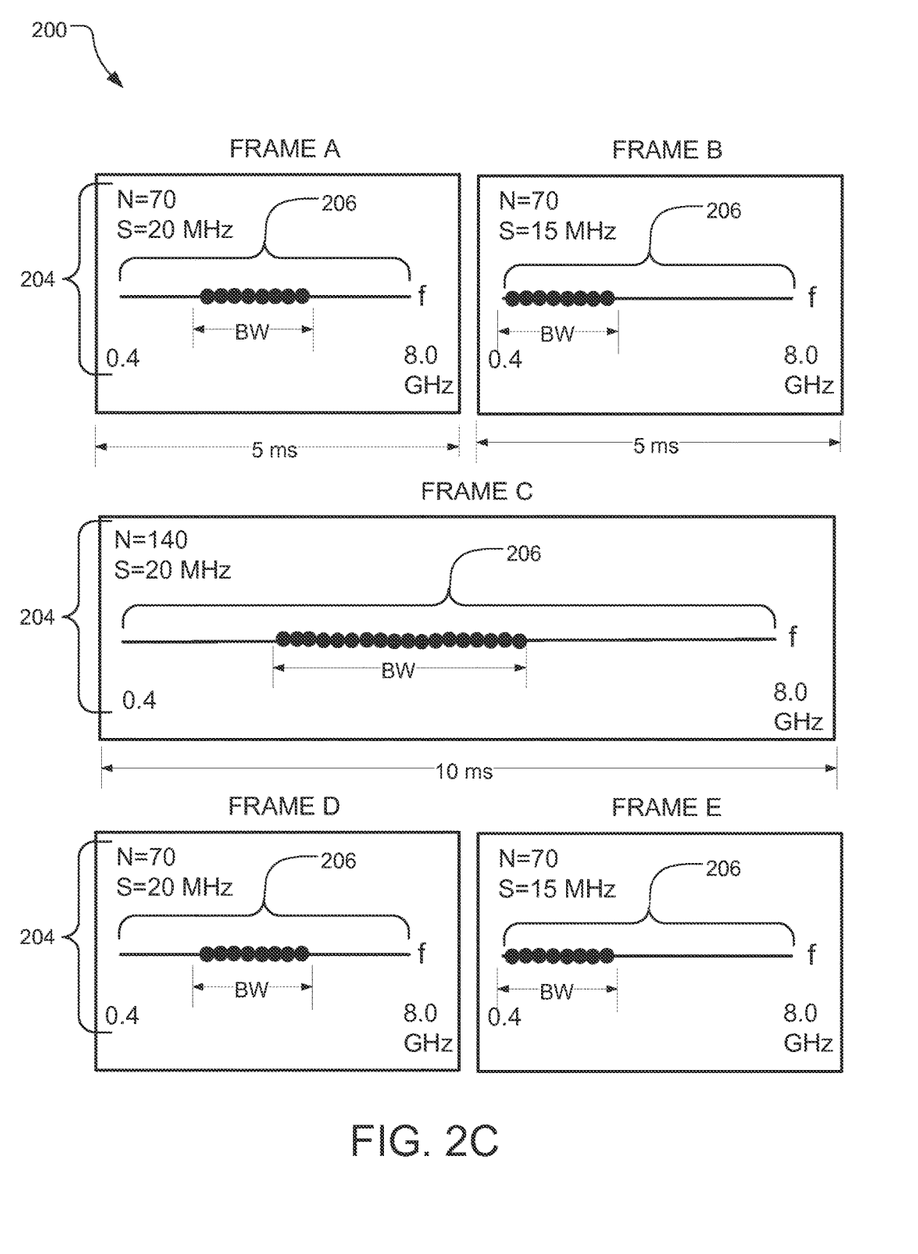

FIGS. 2A-2C depict graphical representations of example sequences of radar frames of a GPR device such as, for example, GPR device 104. Each frame depicts the parameters 204 of the set of signals transmitted during the frame 202. The parameters 204 include the number of signals (N), the step size between the signals (S), and a frequency spectrum 206 of the signals. The frequency spectrum 206 shows the bandwidth (BW) covered by all of the signals of the frame. The points 208 on the spectrum 206 represent frequencies of individual signals. For example, the spectrum 206 may represent the entire spectrum of frequencies that a GPR device is capable of transmitting.

Referring to FIG. 2A, Frame A to Frame C represent an example sequence of radar frames for a GPR device upon detecting a potential target object. As illustrated, each frame 202 has a period of approximately 10 ms for a GPR device with a 100 Hz frame rate. In some examples, the frame period may be different from 10 ms to allow for processing between frames. Frame A represents a frame 202 of signals transmitted before an object has been detected, for example, in a search mode of the GPR device. During Frame A one hundred forty RF signals are transmitted. The signals range in frequency from 0.4 GHz (point 210) to 8.0 GHz (point 212), with a step size of 55 MHz between each signal.

Upon detecting a potential target and estimating that the potential target is at a shallow depth below the ground, the GPR device adjusts the signal parameters 204 for the next frame 202, Frame B, for example, by entering a target interrogation mode. During Frame B, one hundred forty RF signals are again transmitted, however, the step size and bandwidth (BW) and location of the signals on within the frequency spectrum 206 of the GPR device are modified to further analyze the potential target. The signals of Frame B range in frequency from 2.2 GHz (point 210) to 5.0 GHz (point 212), with a step size of 20 MHz between each signal. The frequency band from 2.2 GHz to 5.0 GHz may be selected for the target interrogation mode as that frequency band may provide better detector performance for shallow targets, for example, by minimizing noise from reflections off of clutter buried beneath the object. For potential targets of other types or at other depths, different signal parameters better suited for detecting those potential targets may be used.

In some examples, after transmitting the signals in Frame B, the GPR device may revert back to signal parameters 204 of Frame A, for example, reverting back to a search mode. Thus, as shown in FIG. 2A, Frame C has the same signal parameters 204 as Frame A. In some examples, the GPR device can use the signal parameters of Frame B for several frames 202, for example, to obtain additional data about the potential target. In some examples, the GPR device can use data obtained about the potential target during Frame B to further refine the signal parameters 204 in subsequent frames 202. For example, the GPR device may estimate a more accurate depth based on signals reflected from the potential target during Frame B, and based on the updated depth estimate further refine the signal parameters 204 for a subsequent frame 202. In another example, the GPR device may determine the material of the potential target based on signals reflected from the potential target during Frame B, and refine the signal parameters 204 for a subsequent frame 202 based on the material of the potential target.

Although the frames 202 have been described as having constant step sizes between signal frequencies, in some implementations frequency steps between signals in a frame may vary. For example, in some implementations the set size between frequencies may decrease or grow logarithmically, exponentially, or by another appropriate mathematical relationship. In some implementations, the steps between signal frequencies may be unrelated. For example, a frame may include a set of signals having particular predefined frequencies that are not mathematically related.

Referring to FIG. 2B, Frame A to Frame C represent another example sequence of radar frames for a GPR device. FIG. 2B illustrates another way in which the parameters signals in a radar frame can be modified. Frames A and C are the same as those in FIG. 2A, however, Frame B shows a hybrid search/target interrogation frame. The RF signals in Frame B are transmitted in two overlapping bands (220, 222). Band 220 represents a search band and includes sixty signals transmitted in the same band as Frame A (e.g., 0.4 GHz to 8.0 GHz), but with a larger step size of 120 MHz. Band 222 represents a target interrogation band and includes eighty signals transmitted in a band ranging from 2.3 GHz to 2.7 GHz with a step size of 5 MHz. The signal parameters of Frame B may be used to interrogate a potential target while still providing a broad search band of signals to detect additional targets.

Referring to FIG. 2C, Frame A to Frame E represent yet another example sequence of radar frames for a GPR device. In FIG. 2C Frames A and B represent a modified search mode frame 240. In some implementations, the GPR device can adjust the frame periods on a frame-by-frame basis, and by extension the frame rate. For example, the frame period for frames A, B, D, and E is represented as 5 ms (with a corresponding frame rate of 200 Hz), while the frame period for frame C is 10 ms (with a corresponding frame rate of 100 Hz). Thus in a search mode, the GPR may be able to tailor searches for general target types or targets at general depths by continuously switching between frames with each at a fraction of the overall frame rate independent of any target return signals. For example, Frame A/D may represent a set of signals adapted to detecting targets at a first depth (e.g. shallow targets) or of a first type (e.g., non-metallic targets), and Frame B/E may represent a set of signals adapted for detecting targets at a second depth (e.g., deep targets) or of a second type (e.g., metallic targets). For example, during Frames A and D 70 RF signals are transmitted. The signals range in frequency from 2.2 GHz to 3.6 GHz, with a step size of 20 MHz between each signal. While, during Frames B and E 70 RF signals are transmitted, but with the signals ranging in frequency from 0.4 GHz to 1.4 GHz, with a step size of 15 MHz between each signal.

Frame C represents a target interrogation mode frame similar to Frame B of FIG. 2A. For example, if the GPR device detects a potential target during Frame A or B, the device can transmit signals according to the parameters of Frame C to verify whether the potential target is a target object or clutter, or to analyze characteristics of the potential target in more detail.

In some examples, Frames A and B can include sets of pre-defined frequencies that are optimized for detection of specific types of targets or targets buried at certain depths. For example, Frame A may include a set of frequencies that are optimized to shallow targets and Frame B can include a set of frequencies optimized to deep targets. In such an example, the GPR can shift to Frame C upon detecting a target based on the signals transmitted in either Frame A or B. If, for example, a shallow target is detected based on signals transmitted in Frame A, signals similar to those transmitted in Frame A may be transmitted during Frame C. For example, Frame C may include signals within the same frequency range as those in Frame A, but using a smaller step-size so as to increase the spectral resolution for interrogating the shallow target.

In other examples, upon detecting a target during one of Frame A or Frame B, the GPR may interrogate the target by repeatedly transmitting the appropriate frame signals (Frame A or Frame B) which were used to detect the target. For example, if a deep target is detected during Frame B, the GPR may temporarily stop transmitting Frame A and repeatedly transmit Frame B for a period of time to gather additional information about the target. In other words, in the illustrated example, Frame C (the interrogation frame) may simply be made up of two Frame Bs.

Although the search mode is illustrated as being divided evenly among two frames, the search mode may be divided into any appropriate number of frames. For example, using a frame rate of 400 Hz the search mode may include three frames each including 35 RF signals. In some examples, the Frames A and B can be of unequal periods. For example, Frame A can have a period of 2.5 ms (frame rate of 400 Hz) and include 35 RF signals, while Frame B can have a period of 7.5 ms (frame rate of 133 Hz) and include 105 RF signals. In addition, the GPR can include three or more pre-defined search frames (e.g., Frames A and B) that share the system frame period (e.g., 10 ms or 100 Hz frame rate) divided at appropriate percentages of the system frame period. The frames may further be optimized to target type, environment, or depth such that targets can be detected optimally as if the system were tailored to a specific target type, environment, or depth; but in actuality the system is looking for N different targets in M different environments sequentially. The system, therefore, behaves as if it is optimized for each potential target and environment. Upon detecting a target the GPR can interrogate the target by running only the frame that is optimized to the type, environment, or depth of the detected target at full system frame rate to maximize data and/or spectral resolution.

In some examples, the GPR device can include several programmed types of search modes, for example, search modes optimized for different environments or target types.

The GPR device can present a list of search modes to a user and allow the user to manually select an appropriate search mode. In some examples, the GPR device may permit a user to enter a user defined search mode. That is, the GPR device may permit the user to define the frame parameters for either search or interrogation modes of the GPR device.

In some examples, the GPR device (or a metal detector, e.g., a CWMD) can include a user initiated mode (e.g., a "hover" mode) for interrogating potential targets. The "hover" mode may be triggered by detecting that the motion of the GPR device has stopped (e.g., the user is "hovering" over position), or by a user input such as a hardware or software "button." For example, the during the "hover" mode a user may hold the GPR device over the location of a potential target. The GPR device may detect that the user is "hovering," and in response, the GPR device can adjust the signal transmission frames according to data obtained about a potential target above which the user is "hovering" the GPR device. During the "hover" mode, the GPR device repeatedly transmits either signals from pre-defined interrogation frames (e.g., such as described below in reference to FIG. 3) or adaptively refines signals transmitted during integration frames based on further data obtained about the target. The GPR device exits the "hover" mode and returns to a search mode either upon receiving a user input (e.g., from a hardware or software button) or upon detecting that the user has resumed moving the GPR device.

Figure 3:
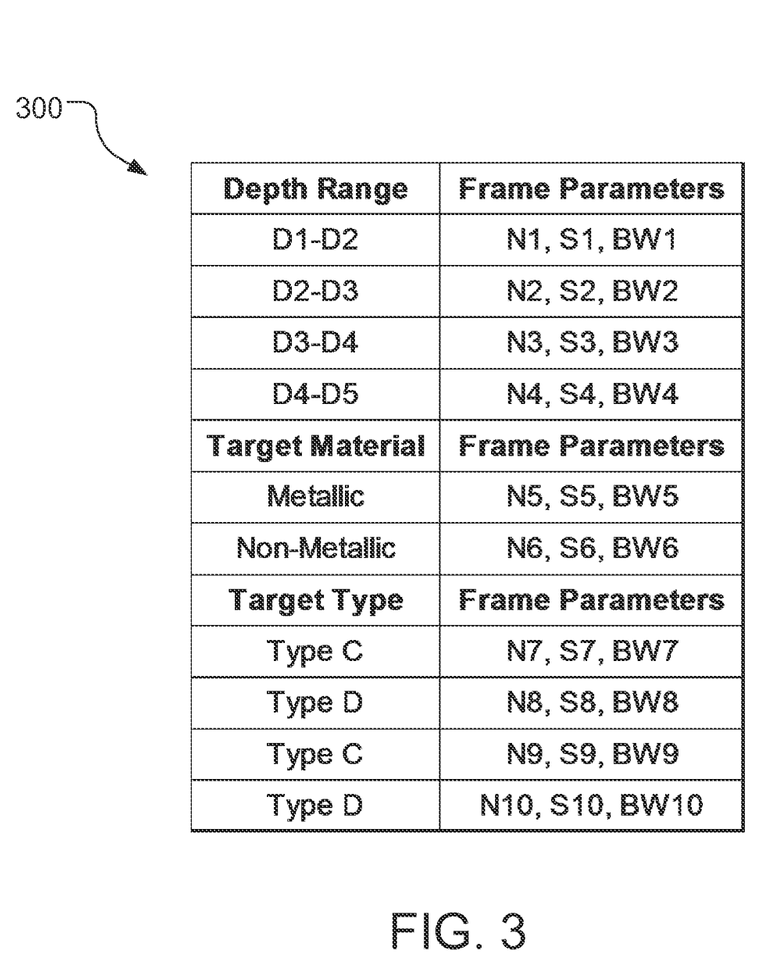
FIG. 3 depicts an example lookup table.

FIG. 3 depicts an example lookup table 300. In some implementations, a GPR device includes a lookup table relating predefined frame parameters to various target and environmental characteristic. For example, upon detecting a potential target, the GPR device can compare characteristics of the target (e.g., estimated depth, target type, target material, target size, or target shape) to entries in the chart in order to determine frame parameters (e.g., number of signals per frame (N), step size (S), and bandwidth (BW)) that are best suited to further analyze the potential target in a target interrogation mode. In other implementations, the GPR device defines mappings between frame parameters and target or environment characteristics in other formats besides a lookup table. For example, the GPR device may use rules or an algorithm for determining frame parameters based on target or environment characteristics.

Figure 4:
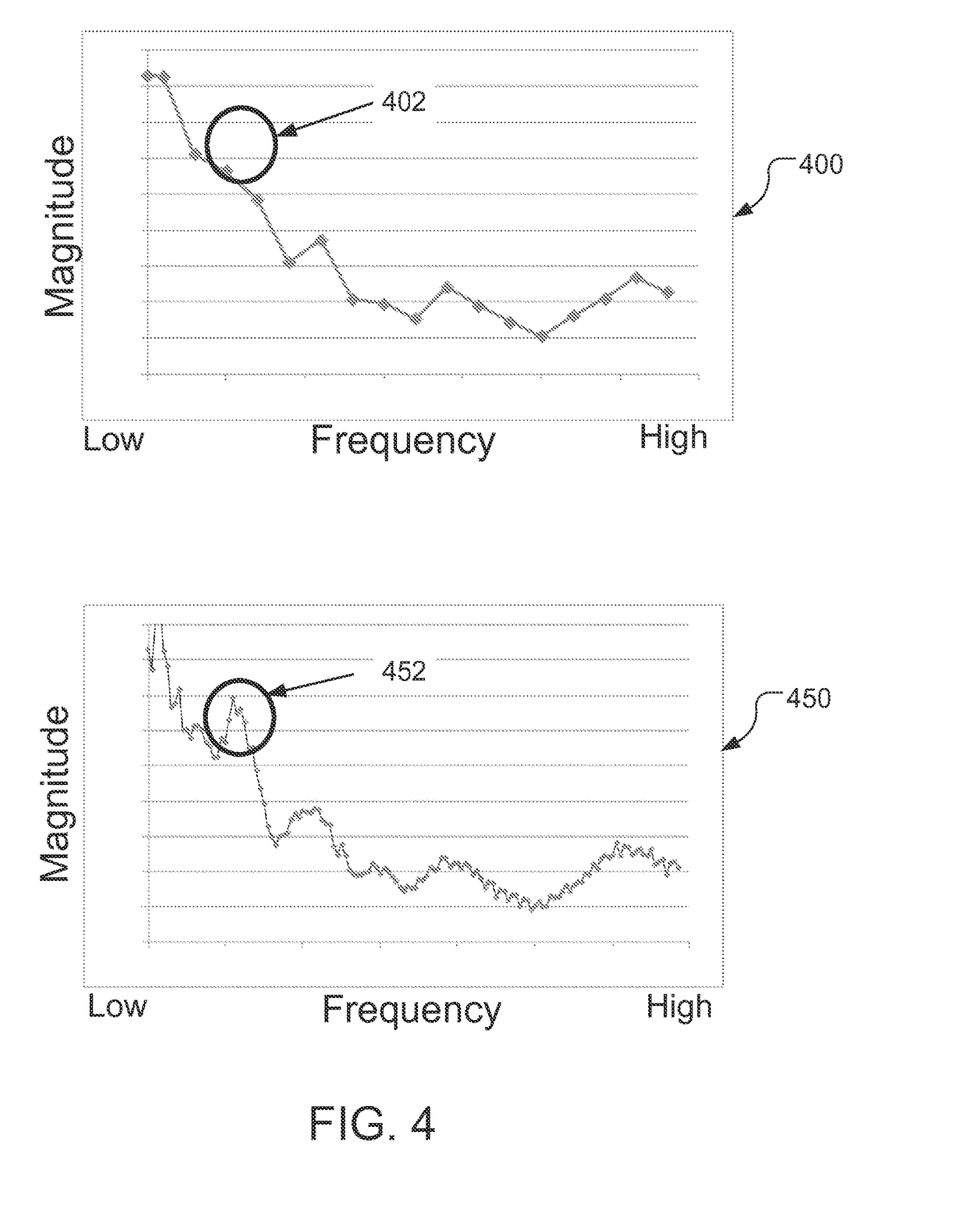
FIG. 4 depicts example data from an example GPR device.

FIG. 4 depicts example data from an example GPR device. Graph 400 shows spectral data from target reflections of GPR transmitted signals. The data in graph 400 represents data from a frame using a relatively large step size between frequencies. That is, the data is sparsely sampled in the frequency domain. Graph 450 also shows spectral data from target reflections of GPR transmitted signals. However, the data in graph 450 represents data from a frame using a relatively small step size between frequencies. That is, the data is more densely sampled in the frequency domain. As illustrated, the more densely sampled data of graph 450 reveals key spectral frequencies (e.g., a discriminating "hump" 452), whereas the "hump" is absent 402 in the more sparsely sampled data of graph 400. Therefore, having the ability to modify signal parameters in real time on a frame-by-frame basis, can improve target detection and classification of GPR systems.

Figure 5:
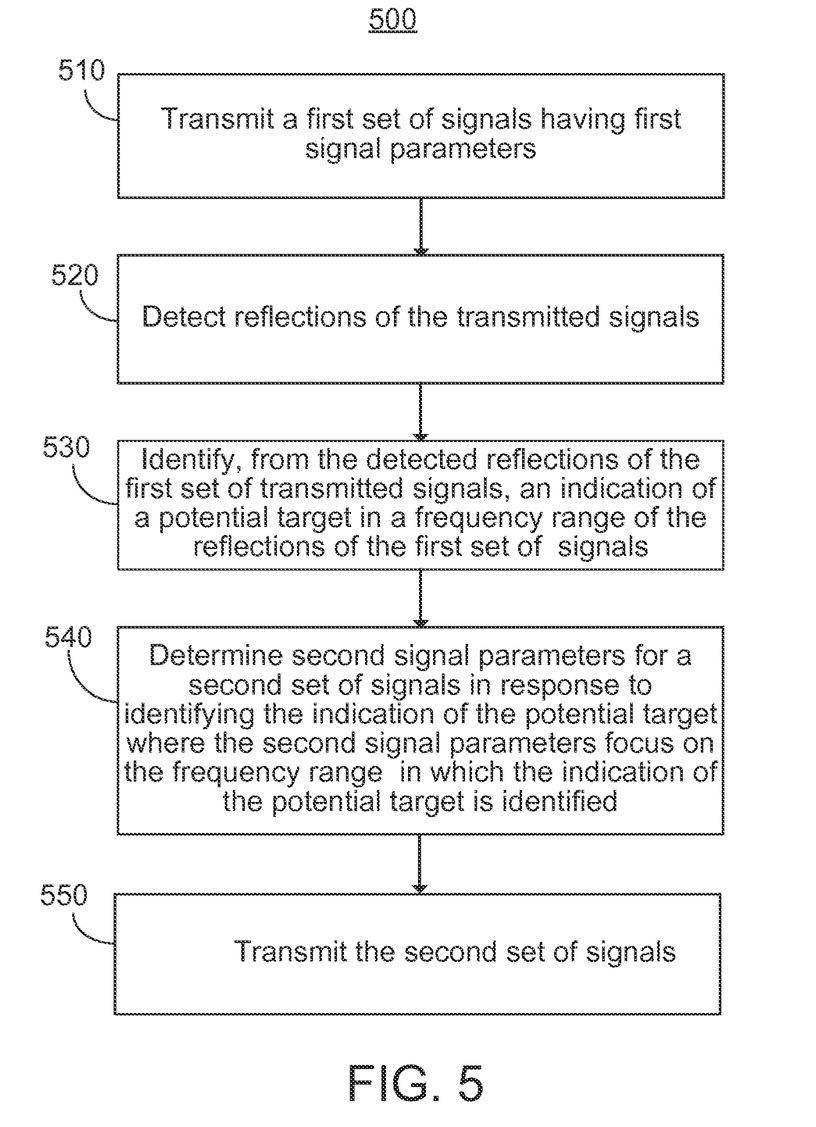
FIG. 5 is a flow chart illustrating an example of a process for operating a GPR device.

FIG. 5 is a flow chart illustrating an example of a process 500 for operating a GPR device. The process 500 may be carried out on the GPR device shown in FIGS. 1A and 1B as discussed above. The process begins by transmitting a first set of stepped-frequency radar signals having first signal parameters (510), for example, by transmitter 160 and antenna 150 of FIG. 1B. The first signal parameters can include, for example, a first bandwidth and a first step size between signal frequencies such as a bandwidth of 0.4 GHz to 8.0 GHz and step size of 55 MHz. Reflections of the transmitted radar signals are received (520), for example, by antenna 155 and receiver 165 of FIG. 1B. An indication of a potential target in a frequency range of the reflections of the first set of radar signals is identified from the detected reflections of the first set of transmitted radar signals (530), for example, by processing system 170 of FIG. 1B.

A second signal parameters for a second set of stepped-frequency radar signals is determined in response to identifying the indication of the potential target (540). For example, the processing system 170 may analyze the reflected signals and determine that characteristics of the reflected signals are indicative of a potential target. Further, the processing system 170 may estimate a depth of the potential target. For example, the estimated depth may be within the range of D4-D5 of the example lookup table 300 shown in FIG. 3. In response and to evaluate further characteristics of the potential target, the processing system 170 may select signal frame parameters N4, S4, and BW4 for transmission in the next radar frame. For example, the signal frame parameters N4, S4, and BW4 may be one hundred forty signals (N4), a step size of 5 MHz (S4), and a bandwidth of 0.4 GHz to 1.1 GHz. Thus, the second signal parameters focus on the frequency range in which the indication of the potential target is identified. The processing system 170 may then cause the transmitter 160 to transmit the second set of radar signals (550).

In some implementations, the first set of stepped-frequency radar signals is transmitted during a first frame period, and the second set of stepped-frequency radar signals is transmitted during a second frame period. In some implementations, the second set of stepped-frequency radar signals includes a first subset of stepped-frequency radar signals and a second subset of stepped-frequency radar signals. In some examples, the first set of radar signals is transmitted during a first frame period, and the second set of radar signals, including the first and second subsets of radar signals, is transmitted during a second frame period.

In some implementations, the second signal parameters for the second set of radar signals are determined based on an estimated a depth of the potential target. In some examples, the second signal parameters for the second set of radar signals are determined based on determining a material or type of the potential target. In some examples, the second signal parameters are determined from lookup table relating predefined parameters to target depth, target type, or target material.

The operations described in this specification can be implemented as operations performed by a processing system on data stored on one or more computer-readable storage devices or received from other sources. The term "processing system" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, an operating system, The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

To provide for interaction with a user, implementations of the subject matter described in this specification can be implemented on a detecting device having a display, for example, a CRT (cathode ray tube) or LCD (liquid crystal display) monitor, for displaying information to the user and a keyboard and a pointing device (e.g., touch screen or a trackball) by which the user can provide input to the detecting device.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results.

In addition, the processes depicted in the accompanying figures do not necessarily require the particular order shown, or sequential order, to achieve desirable results. In certain implementations, multitasking and parallel processing may be advantageous.

What is claimed is:

1. A method for operating a continuous wave (CW) object detection device, the method comprising:
   transmitting a first set of stepped-frequency CW signals having first signal parameters, the first signal parameters including a first bandwidth and a first step size between signal frequencies;
   detecting reflections of the first set of transmitted CW signals;
   identifying, from the detected reflections of the first set of transmitted CW signals, an indication of a potential target in a frequency range of the reflections of the first set of transmitted CW signals;
   in response to identifying the indication of the potential target, determining second signal parameters for a second set of stepped-frequency CW signals, the second signal parameters including a second bandwidth and a second step size between signal frequencies, and wherein the second signal parameters focus on the frequency range in which the indication of the potential target is identified; and
   transmitting the second set of CW signals.

2. The method of claim 1, wherein the first set of stepped-frequency CW signals is transmitted during a first frame period, and the second set of stepped-frequency CW signals is transmitted during a second frame period.

3. The method of claim 1, wherein the second bandwidth is smaller than the first bandwidth and the second step size is smaller than the first step size.

4. The method of claim 3, wherein the second bandwidth encompasses the frequency range of the first set of CW signals in which the potential target is identified.

5. The method of claim 1, wherein the second set of stepped-frequency CW signals comprises a first subset of stepped-frequency CW radar signals and a second subset of stepped-frequency CW signals,
   wherein the first subset of stepped-frequency CW signals has:
      a bandwidth approximately the same as the first bandwidth, and
      a step size greater than the first step size, and
   wherein the second subset of stepped-frequency CW signals has:
      a bandwidth less than the first bandwidth that encompasses the frequency range of the first set of CW signals in which the potential target is identified, and
      a step size less than the first step size.

6. The method of claim 5, wherein the first set of stepped-frequency CW signals is transmitted during a first frame period, and the second set of stepped-frequency CW radar signals, including the first and second subsets stepped-frequency CW signals, is transmitted during a second frame period.

7. The method of claim 1, wherein the second signal parameters for the second set of stepped-frequency CW signals are determined based on estimating a depth of the potential target.

8. The method of claim 1, wherein the second signal parameters for the second set of stepped-frequency CW signals are determined based on determining a material, size, or shape of the potential target.

9. The method of claim 1, wherein the first set of stepped-frequency CW radar signals comprises a first subset of stepped-frequency CW radar signals and a second subset of stepped-frequency CW radar signals,
   wherein the first subset of stepped-frequency CW radar signals are configured for detecting a first target type or targets at a first depth, and
   wherein the second subset of stepped-frequency CW radar signals are configured for detecting a second target type or targets at a second depth.

10. A ground penetrating radar (GPR) device comprising:
   an antenna configured to transmit and receive stepped-frequency continuous wave (CW) radar signals;
   an electronic processor coupled to an electronic storage, the electronic storage comprising instructions, that when executed, cause the processor to perform operations comprising:
      transmitting a first set of stepped-frequency CW radar signals having first signal parameters, the first signal parameters including a first bandwidth and a first step size between signal frequencies;

detecting reflections of the first set of transmitted CW radar signals;

identifying, from the detected reflections of the first set of transmitted CW radar signals, an indication of a potential target in a frequency range of the reflections of the first set of transmitted CW radar signals;

in response to identifying the indication of the potential target, determining second signal parameters for a second set of stepped-frequency CW radar signals, the second signal parameters including a second bandwidth and a second step size between signal frequencies, and wherein the second signal parameters focus on the frequency range in which the indication of the potential target is identified; and transmitting the second set of CW radar signals.

11. The device of claim 10, wherein the first set of stepped-frequency CW signals is transmitted during a first frame period, and the second set of stepped-frequency CW signals is transmitted during a second frame period.

12. The device of claim 10, wherein the second set of stepped-frequency CW signals comprises a first subset of stepped-frequency CW radar signals and a second subset of stepped-frequency CW signals, wherein the first subset of stepped-frequency CW signals has:
a bandwidth approximately the same as the first bandwidth, and
a step size greater than the first step size, and wherein the second subset of stepped-frequency CW signals has:
a bandwidth less than the first bandwidth that encompasses the frequency range of the first set of CW signals in which the potential target is identified, and
a step size less than the first step size.

13. The device of claim 12, wherein the first set of stepped-frequency CW signals is transmitted during a first frame period, and the second set of stepped-frequency CW radar signals, including the first and second subsets stepped-frequency CW signals, is transmitted during a second frame period.

14. The device of claim 10, wherein the second signal parameters for the second set of stepped-frequency CW signals are determined based on estimating a depth of the potential target.

15. The device of claim 10, wherein the second signal parameters for the second set of stepped-frequency CW signals are determined based on determining a material, size, or shape of the potential target.

16. The device of claim 10, wherein the first set of stepped-frequency CW radar signals comprises a first subset of stepped-frequency CW radar signals and a second subset of stepped-frequency CW radar signals, wherein the first subset of stepped-frequency CW radar signals are configured for detecting a first target type or targets at a first depth, and wherein the second subset of stepped-frequency CW radar signals are configured for detecting a second target type or targets at a second depth.

17. A method for operating a continuous wave (CW) ground penetrating radar (GPR), the method comprising:

transmitting a first set of stepped-frequency CW radar signals during a first frame, the first set of CW radar signals having first signal parameters including a first bandwidth and a first step size between signal frequencies;

detecting reflections of the first set of transmitted CW radar signals;

transmitting a second set of stepped-frequency CW radar signals radar signals during a second frame, the second set of CW radar signals having second signal parameters including a second bandwidth and a second step size between signal frequencies, wherein the second signal parameters are different from the first signal parameters; and detecting reflections of the second set of transmitted CW radar signals, and wherein the first signal parameters represent predefined parameters adapted to detecting shallow targets and the second signal parameters represent predefined parameters adapted to detecting deep targets.

18. The method of claim 17, further comprising:

identifying, from the detected reflections of the first set of transmitted CW radar signals or the second set of transmitted CW radar signals, an indication of a potential target in a frequency range of the reflections;

in response to identifying the indication of the potential target, determining third signal parameters for a third set of stepped-frequency CW radar signals, the third signal parameters including a third bandwidth and a third step size between signal frequencies, and wherein the third signal parameters focus on the frequency range in which the indication of the potential target is identified; and transmitting the third set of CW radar signals during a third frame.

19. The method of claim 18, wherein a period of the third frame is longer than periods of the first and second frames.

* * * * *